United States Patent
Randria et al.

(10) Patent No.: US 10,270,302 B2
(45) Date of Patent: Apr. 23, 2019

(54) ELECTRIC MOTOR ROTOR AND ELECTRIC MOTOR ASSOCIATED

(71) Applicant: ALSTOM TRANSPORT TECHNOLOGIES, Saint-Ouen (FR)

(72) Inventors: Andry Randria, Besancon (FR); Bruno Raguin, Beure (FR)

(73) Assignee: Alstom Transport Technologies, Saint-Ouen (FR)

( * ) Notice: Subject to any disclaimer, the term of this patent is extended or adjusted under 35 U.S.C. 154(b) by 344 days.

(21) Appl. No.: 15/043,250

(22) Filed: Feb. 12, 2016

(65) Prior Publication Data
US 2016/0241095 A1 Aug. 18, 2016

(30) Foreign Application Priority Data
Feb. 16, 2015 (FR) .................................... 15 51282

(51) Int. Cl.
*H02K 1/27* (2006.01)
*H02K 1/04* (2006.01)

(52) U.S. Cl.
CPC ............ *H02K 1/2753* (2013.01); *H02K 1/04* (2013.01); *H02K 1/2766* (2013.01); *H02K 2201/06* (2013.01)

(58) Field of Classification Search
CPC ...... H02K 1/04; H02K 1/2753; H02K 1/2766; H02K 2201/06
USPC ................................... 310/156.08
See application file for complete search history.

(56) References Cited

U.S. PATENT DOCUMENTS

| 5,838,086 A | 11/1998 | Cuenot et al. | |
|---|---|---|---|
| 2002/0079770 A1* | 6/2002 | Lai | H02K 1/278 310/156.28 |
| 2009/0121582 A1* | 5/2009 | Shinoda | H02K 1/276 310/261.1 |
| 2010/0013338 A1* | 1/2010 | Takahashi | H02K 1/276 310/156.38 |
| 2010/0176682 A1* | 7/2010 | Kori | H02K 1/276 310/156.53 |
| 2011/0215669 A1* | 9/2011 | Spitz | H02K 3/527 310/214 |
| 2013/0249342 A1 | 9/2013 | Funk et al. | |
| 2014/0138951 A1* | 5/2014 | Kuczaj | H02K 5/04 290/52 |

FOREIGN PATENT DOCUMENTS

DE 102006011729 A1 9/2007
EP 1014542 A2 6/2000

OTHER PUBLICATIONS

Search Report dated Jan. 20, 2016 in ES application No. 1551282.

* cited by examiner

*Primary Examiner* — Alex W Mok
(74) *Attorney, Agent, or Firm* — Knobbe, Martens, Olson & Bear, LLP

(57) ABSTRACT

An electric motor rotor includes a substantially cylindrical body, which conducts a magnetic field, and defines at least one housing receiving a group of magnets that includes at least two permanent magnets. Two circumferentially adjacent magnets of the housing are separated from one another by an air knife.

13 Claims, 3 Drawing Sheets

ELECTRIC MOTOR ROTOR AND ELECTRIC MOTOR ASSOCIATED

CROSS-REFERENCE TO RELATED APPLICATION

This application claims priority to French Patent Application No. 15 51282 filed on Feb. 16, 2015, the disclosure of which including the specification, the drawings, and the claims is hereby incorporated by reference in its entirety

FIELD OF THE INVENTION

The present invention relates to an electric motor rotor comprising a substantially cylindrical body, conducting a magnetic field, defining at least one housing receiving a group of magnets comprising at least two permanent magnets.

BACKGROUND OF THE INVENTION

Document EP 2,264,860 describes an electric motor rotor comprising a tubular foliated assembly and "buried" magnets, i.e., not extended over the periphery of the rotor. Housings formed in this assembly each receive a group of permanent magnets, each group of permanent magnets forming a magnetic pole of the rotor. All of the magnets in a same group are covered, on each of their faces, with electrically insulating material designed to insulate the magnets from one another and relative to the foliated assembly.

Such a rotor is not fully satisfactory. Indeed, the addition of an insulating material surrounding the magnets individually on each of their faces increases the manufacturing cost of the rotor and makes the assembly method more complex.

SUMMARY OF THE INVENTION

One aim of the invention is to propose an electric motor rotor having satisfactory magnetic properties while being able to be assembled easily and quickly.

To that end, the invention relates to an electric motor rotor as described above, in which the two circumferentially adjacent magnets of the housing are separated from one another by an air knife.

The invention makes it possible to avoid adding an insulating material on each of the faces of the permanent magnet, which makes the assembly method of the rotor easier, and makes it possible to implement a less expensive rotor than a rotor with blocks of magnetic elements glued and insulated with respect to one another.

The rotor according to the invention can comprise one or more of the following features, considered alone or according to any technically possible combination:
the air knife has a thickness greater than or equal to 0.01 mm;
the housing defines notches for receiving permanent magnets, each magnet being inserted into a respective notch by one of its longitudinal ends, and the notches being configured such that two circumferentially adjacent magnets of a same housing are separated from one another by the air knife when their ends are engaged in their respective notches;
two circumferentially adjacent magnets, respectively inserted into a notch of the housing, are radially offset;
the adjustment between the notch and the magnet is at least a sliding adjustment so as to allow placement of the magnet in its notches by hand, an immobilization of the magnet in its notches, and a disassembly of the magnet from its notches without damaging the magnet;
the magnet has a unique elementary block shape having a bevel on each of its edges;
the periphery of the body is formed by a metal matrix of said body, the housing extending away from said periphery;
the main axis of the housing forms a non-zero angle with a radial direction of the body;
two circumferentially adjacent and symmetrical housings in the radial direction of the body form a V-shaped magnetic pole or a substantially planar magnetic pole;
several poles distributed symmetrically according to a rotational symmetry;
the body comprises a substantially planar face extending at the periphery of said body between two circumferentially adjacent poles;
it comprises a stack of bodies forming a foliated assembly.

The invention also relates to an electric motor comprising a rotor as defined above.

BRIEF DESCRIPTION OF THE DRAWINGS

The invention will be better understood upon reading the following description, provided solely as an example and done in reference to the appended drawings, in which.

DETAILED DESCRIPTION OF THE PREFERRED EMBODIMENTS

In the rest of this document, the "axial" direction is to be understood as the direction extending along the rotation axis of the motor 1, and the "radial" direction refers to a direction perpendicular to that rotation axis.

Figure 1:
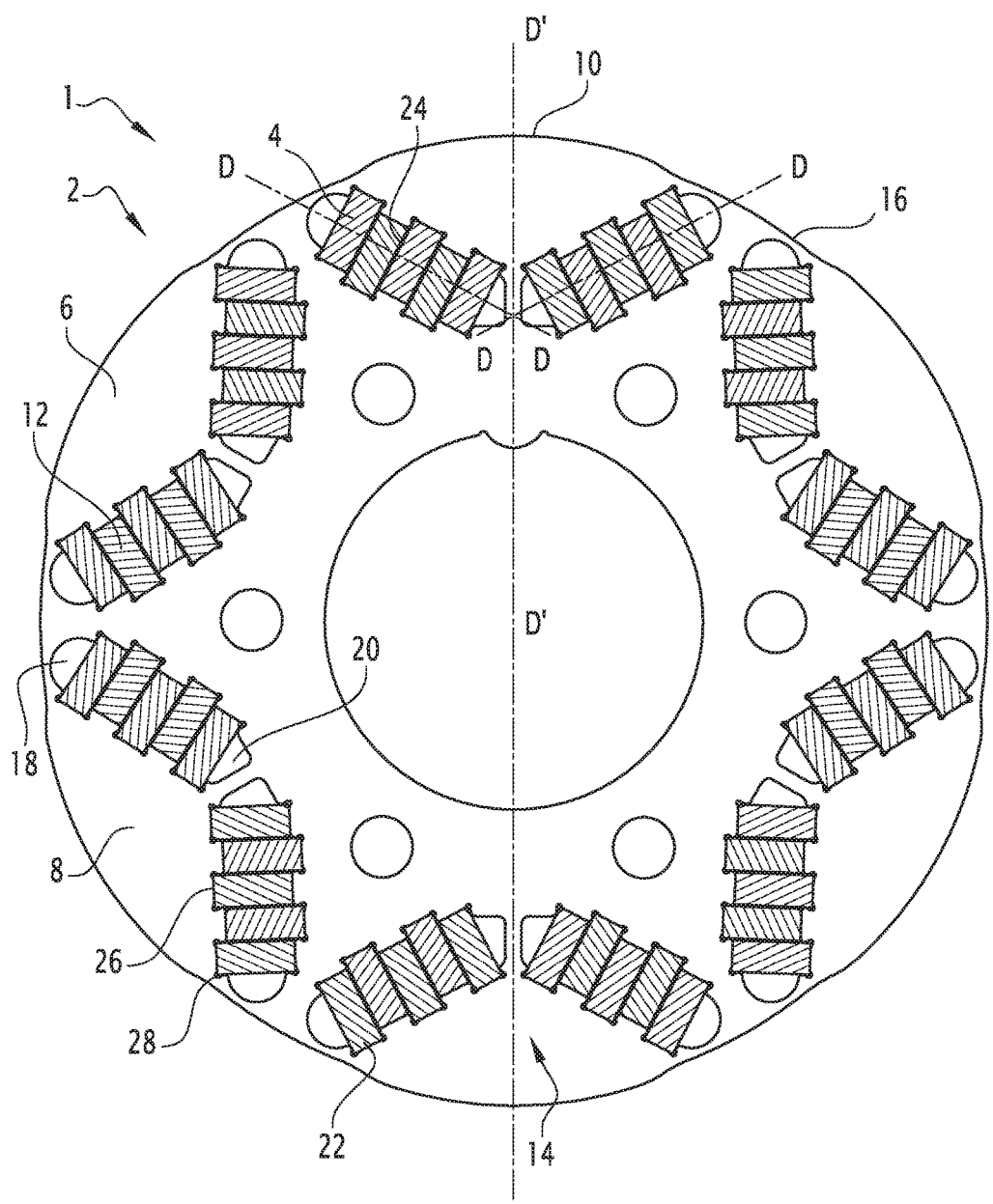
FIG. 1 is a radial sectional view of a rotor according to the invention.

As shown in FIG. 1, an electric motor 1 comprises a stator secured to a casing (not shown) and a rotor 2 secured to a shaft and rotatable around an axis relative to the stator.

The rotor 2 comprises a hub (not shown) secured in rotation using driving means (not shown) on the shaft, a substantially cylindrical foliated tubular assembly extending along the rotation axis, surrounding the hub and fitted tightly on the periphery of the hub at each of its axial ends, and magnetic elements 4, for example, permanent magnets, distributed on the inner perimeter of the foliated assembly.

The magnetic elements 4 are permanent magnets, each being made in the form of a single elementary block, for example, substantially parallelepiped and having a bevel on each of its edges, to facilitate its insertion into the foliated assembly, as will be described later.

The permanent magnets 4 are for example made from samarium cobalt (SmCo) or neodymium iron boron (NdFeB). For a permanent magnet 4 made from neodymium iron boron, the outer surface of the permanent magnet 4 advantageously comprises a surface coating protecting it from corrosion.

The foliated assembly is formed by a stack of bodies 6 in the form of a machined or cut metal sheet, which is magnetically conductive, the foliated assembly being covered over its outer radial surfaces by a magnetic insulating plate (not shown) designed to keep the permanent magnets 4 housed inside the stack. In other words, the metal sheets situated at the axial ends of the stack are covered by an insulating plate, for example formed from a sheet of insulating material.

The magnetic insulating plate is able to block the axial movement of the permanent magnets 4. The magnetic insulating plate is able to avoid short-circuits of magnetic flow.

The insulating plate comprises a non-ferromagnetic plate, advantageously made from an aluminum alloy. The insulating plate is screwed on the hub.

The bodies 6 are stacked along the rotation axis to form the foliated assembly. The bodies 6 are formed by a metal matrix.

Each body 6 extends along the rotation axis of the rotor 2. The body 6 has a substantially cylindrical shape and has an annular shape.

The body 6 comprises a first and second planar main surface 8, extending in a radial plane, i.e., substantially perpendicular to the rotor axis 2, and a peripheral surface 10 connecting the first and second main surfaces 8 to the outer radial ends of the main surfaces 8 and extending in the axial direction.

As illustrated in FIG. 1, the foliated assembly defines housings 12, crossing through the assembly along an axis extending in the axial direction, forming magnetic poles 14, each pole being formed by a pair of housings 12. According to the embodiment shown in the figures, the foliated assembly for example comprises twelve housings 12 forming six magnetic poles 14.

The peripheral surface 10 of the body comprises faces 16, each face 16 extending along two circumferentially adjacent poles 14. The faces 16, for example substantially planar, are connected to one another by curved segments having an arc of circle section with a radius equal to the radius of the assembly, each curved segment extending across from two adjacent housings 12. The peripheral surface 10 and the faces 16 define the appearance of the generated magnetic flow.

Each housing 12 of the body is designed to receive a plurality of permanent magnets 4 having a same polarity.

Each housing 12 is substantially an oblong hole crossing through the rotor 2 and emerging axially in the outer main surfaces of the foliated assembly. The housings 12 are at a distance from the peripheral surface 10 of the body. The housing 12 extends, in cross-section, i.e., in a radial plane, along a main axis D, between a first end 18 close to the peripheral surface 10 and a second end 20 extending at a distance from the peripheral surface 10 and closer to the rotation axis.

Figure 2:
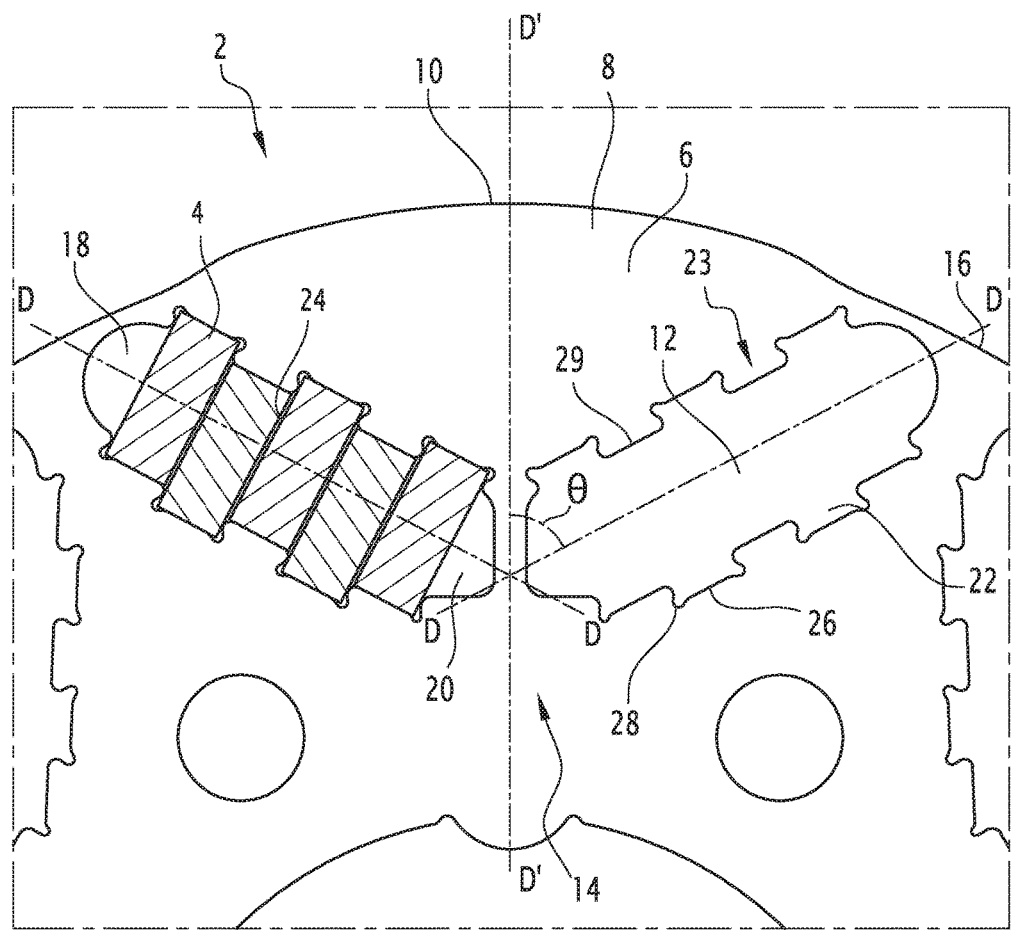
FIG. 2 is a sectional detail view of a pole of the rotor of FIG. 1.

The main axis D of the housing 12 is substantially perpendicular to the axial direction and forms a non-zero angle θ with a radial axis D' passing between this housing and an adjacent housing, as shown in FIG. 2.

Two circumferentially adjacent and substantially symmetrical housings 12 relative to the radial axis D' passing between these two housings 12 form a pole 14. These two housings 12 thus form a V. According to the embodiment shown in the figures, six poles 14 are distributed symmetrically on the main surface 8 of the body. The housings 12 of each pole 14 have permanent magnets 4 with a same polarity. Two circumferentially adjacent poles 14 successively have an alternating polarity of the permanent magnets 4.

Figure 3:
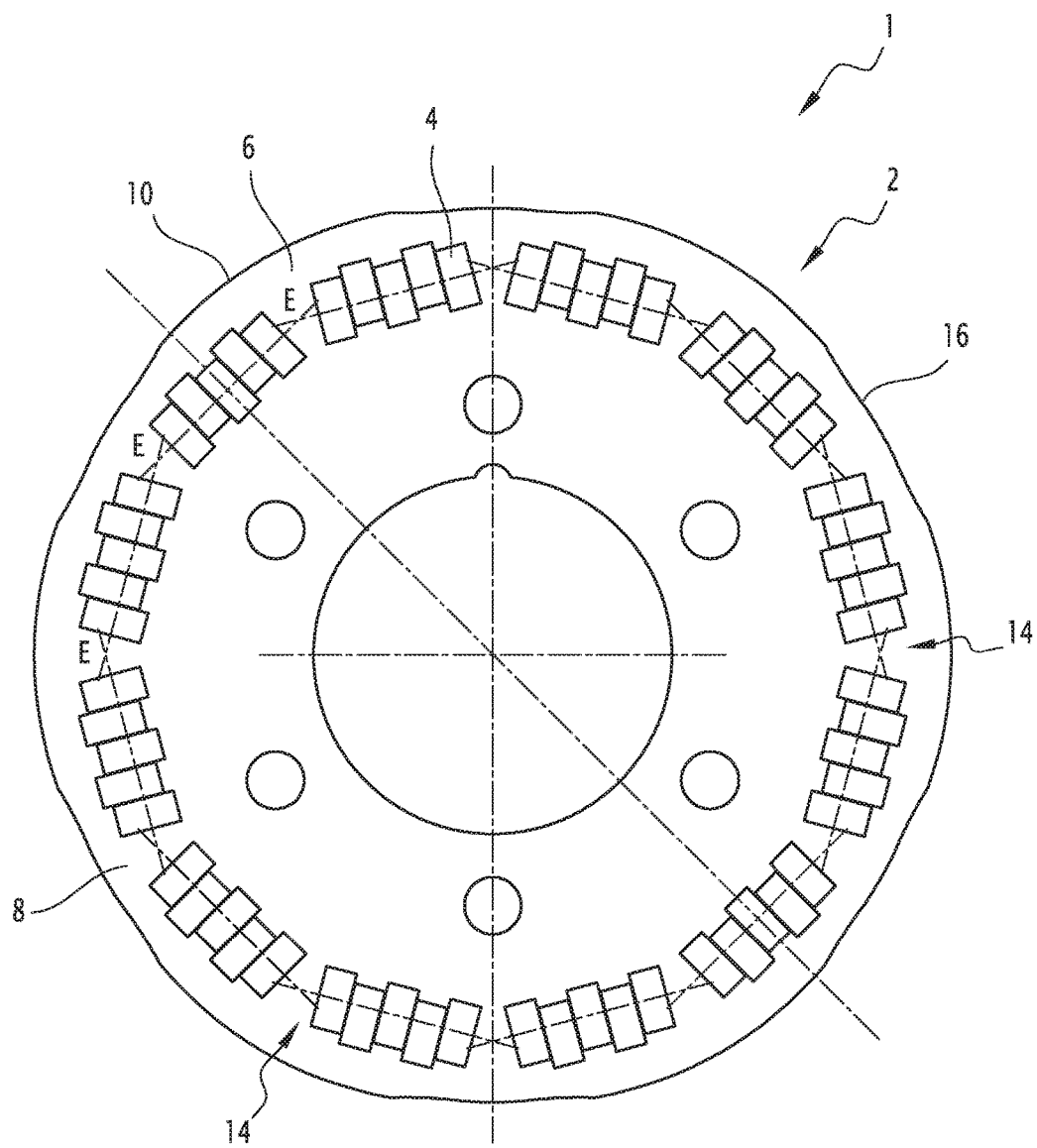
FIG. 3 is a simplified radial sectional view of a rotor according to a second embodiment of the invention.

Alternatively, as illustrated by FIG. 3, the housing 12 extends along a main axis E, substantially perpendicular to a radial axis passing through an axis of symmetry of the housing 12.

The first end 18 of the housing for example substantially has the contour of a half-circle whereof a radius extends along the main axis D of the housing 12.

The second end 20 of the housing has the contour of an unwarped half-circle. The second end 20 has a contour arranged advantageously to homogenously distribute the internal stresses related to the removal of material in the housings 12.

The housing 12 further has an arrangement of notches 22 and intermediate zones 23 such that two successive notches 22 along the main axis D of the housing 12 are separated by an intermediate zone 23, and a notch 22, in a direction perpendicular to the main and axial direction of the housing 12, is across from an intermediate zone 23 in a same housing 12.

The notches 22 are designed to receive a longitudinal end of the permanent magnet 4, such that two circumferentially adjacent magnets 4 of the housing 12 are separated from one another by an air knife 24.

The notches 22 extend parallel to the rotation axis of the rotor 2 and form an end part of the housing 12 along an axis perpendicular to the main axis D of the housing 12 and the axial direction. Two adjacent and/or facing notches 22 along a direction perpendicular to the main axis D of the housing 12 are circumferentially offset.

The notch 22 is substantially in a dovetail container shape to facilitate the insertion of the permanent magnets 4. As illustrated in FIG. 2, the notch 22 has a flat bottom 26 extending longitudinally along the rotation axis of the rotor 2 and transversely along the main axis D of the housing 12, connected to the intermediate zone 23 by two faces extending along an axis substantially perpendicular to the main axis D.

The notch 22 also has a clearance angle 28 at the intersection between the bottom 26 and the faces connecting to the intermediate zone 23.

The bottom 26 has a width, along the main axis D, greater than the width of the permanent magnet 4. The gap between the width of the bottom 26 and that of the permanent magnet 4 is approximately 0.1 mm.

The intermediate zone 23 forms the other end part of the housing 12 along an axis perpendicular to the main axis D of the housing 12 and the axial direction and has both faces, and an intermediate face 29 extending between two successive notches 22 along the main axis D of the housing 12.

The intermediate face 29 has a width greater than the width of the bottom 26, able to form the insulating air knife. The deviation between the width of the intermediate face 29 and that of the bottom 26 is approximately 0.1 mm.

The intersection between the two faces and the intermediate faces 29 is advantageously rounded.

Each notch 22 and each intermediate zone 23 thus has a shape suitable for separating each permanent magnet 4 from another permanent magnet 4 circumferentially adjacent to it, so as to produce insulation by the air knife 24 between each circumferentially adjacent permanent magnet 4, i.e., the adjacent permanent magnets are not in contact with one another.

The notches 22 are configured such that two circumferentially adjacent magnets 4 in the same housing 12 are separated from one another by the air knife 24 when the ends of the permanent magnets 4 are engaged in the respective notches 22.

The air knife 24 extends in a plane substantially perpendicular to the main axis D of the housing 12.

The air knife 24 thus extends between the side faces of two circumferentially adjacent permanent magnets 4. The air knife 24 advantageously has a thickness greater than 0.01 mm, for example equal to 0.1 mm.

Furthermore, the notch 22 has a shape suitable for minimizing contact between the permanent magnet 4 and the body 6 of the rotor.

The adjustment of the permanent magnet 4 between the faces of the bottom 26 and the intermediate face 29 is a sliding adjustment, so as to allow placement by hand, immobilization and disassembly of the magnet 4 from its notch 22, without damaging the magnet 4. The presence of a bevel on the edges of the magnet facilitates this placement, as previously described.

The permanent magnets 4 are thus mounted sliding in the notches 22 of the housing, and they are individually removable from the notches 22 of the housing. The permanent magnets 4 can move under the effect of the vibrations and/or variations in speed and magnetic field, but cannot come into contact.

The permanent magnets 4 are free to move with a play defined by the adjustment between the magnet 4 and the housing 12 of the body. This adjustment, defined between the housing 12 and the permanent magnets 4, prevents any contact between two circumferentially adjacent magnets 4.

Such a rotor 2 makes it possible, owing to the air knives 24 separating the magnets 4, to avoid the addition of an insulating material to guarantee that the permanent magnets 4 are insulated from one another. Such a rotor 2 has the advantage of being able to use permanent magnets 4 inserted in the notches 22 that is less expensive than blocks of magnetic elements glued and insulated with respect to one another.

Such a rotor 2 has the advantage of being able to facilitate the placement of the permanent magnets 4 in the so-called "buried" housing 12, versus a so-called "surface" housing.

The rotor 2 has the advantage of preventing the permanent magnets 4 from touching one another owing to the shape of the notches 22 of the body. If contact occurs between two circumferentially adjacent magnets 4 or between permanent magnets 4 and the body 6, it is localized and periodic. Consequently, the increase in losses in the magnets remains very small, and the performance of the motor remains very high.

What is claimed is:

1. An electric motor rotor comprising a substantially cylindrical body, which conducts a magnetic field and defines at least one housing receiving a group of magnets comprising at least two permanent magnets,
   wherein circumferentially adjacent magnets of the at least two permanent magnets in the housing are separated from one another by an air knife,
   the at least one housing comprising a plurality of notches and a plurality of intermediate zones such that the plurality of notches are arranged along a main axis of the housing and separated from one another by one of the plurality of intermediate zones, and
   each notch, in a direction perpendicular to the main axis of the housing, faces the respective intermediate zones in the housing.

2. The rotor according to claim 1, wherein the air knife has a thickness greater than or equal to 0.01 mm.

3. The rotor according to claim 1, wherein each magnet is inserted into the respective notches by one of its longitudinal ends, and each of the notches are configured such that the at least two permanent magnets circumferentially adjacent in the housing are separated from one another by the air knife when their ends are engaged in their respective notches.

4. The rotor according to claim 3, wherein the at least two permanent magnets circumferentially adjacent in the housing are radially offset.

5. The rotor according to claim 3, wherein the adjustment between each notch and the respective permanent magnets is at least a sliding adjustment so as to allow placement, immobilization, and disassembly of the respective permanent magnets by hand, without damaging the respective permanent magnets.

6. The rotor according to claim 5, wherein each magnet has a unique elementary block shape having a bevel on each of its edges.

7. The rotor according to claim 1, wherein the periphery of the body is formed by a metal matrix of said body, and each housing extending away from said periphery.

8. The rotor according claim 1, wherein the main axis of each housing forms a non-zero angle with a radial direction of the body.

9. The rotor according to claim 1, wherein the substantially cylindrical body defines at least two housings and the at least two housings are arranged circumferentially adjacent and symmetrical in the radial direction of the body so as to form a V-shaped magnetic pole or a substantially planar magnetic pole.

10. The rotor according to claim 9, wherein the body comprises several poles distributed symmetrically according to a rotational symmetry.

11. The rotor according to claim 9, wherein the body comprises a substantially planar face extending at the periphery of said body between two circumferentially adjacent poles.

12. The rotor according to claim 1, wherein it comprises a stack of bodies forming a foliated assembly.

13. An electric motor comprising a rotor according to claim 1.

* * * * *